Dec. 24, 1957
F. G. BLAKE
2,817,715
AMPLIFIER CIRCUIT HAVING LINEAR AND
NON-LINEAR AMPLIFICATION RANGES
Filed July 15, 1952
3 Sheets-Sheet 1
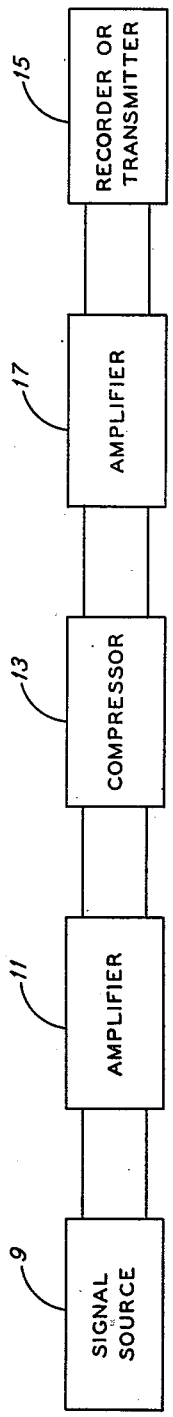
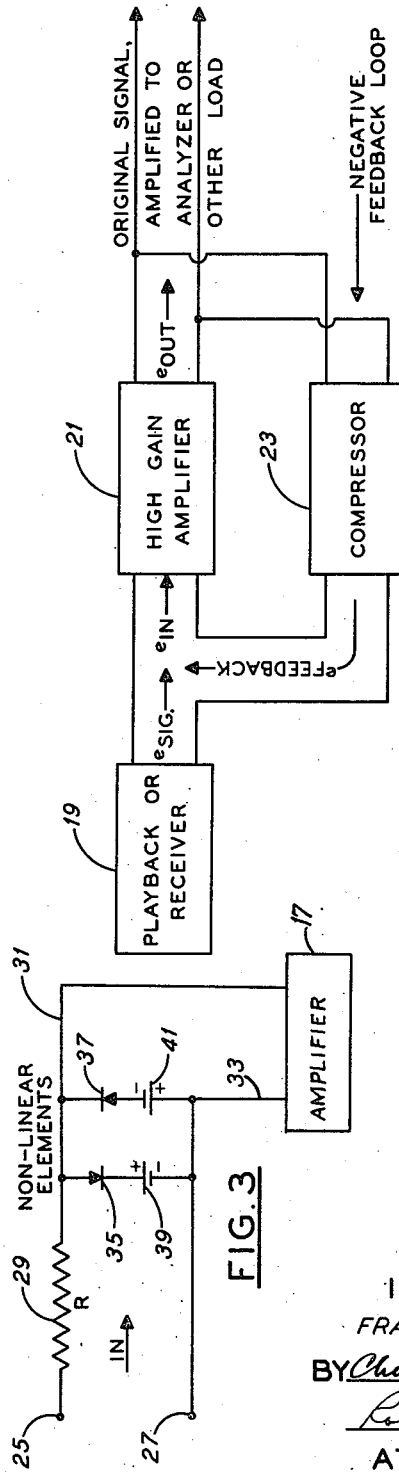
INVENTOR
FRANCIS G. BLAKE
BY *Charles J. Gibeau*
*Roes Rogers Jr.*
ATTORNEYS Dec. 24, 1957  F. G. BLAKE  2,817,715
AMPLIFIER CIRCUIT HAVING LINEAR AND
NON-LINEAR AMPLIFICATION RANGES
Filed July 15, 1952  3 Sheets-Sheet 3
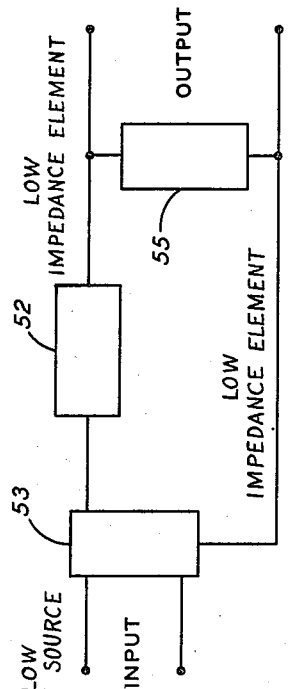
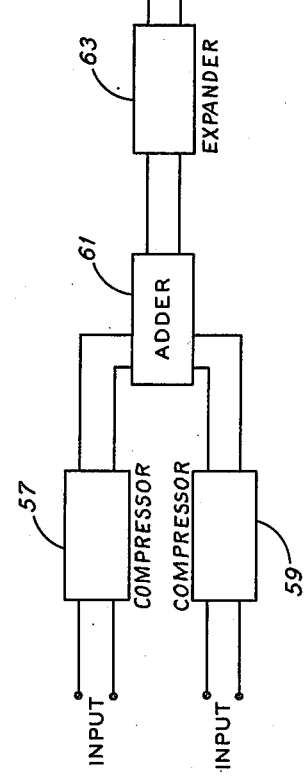
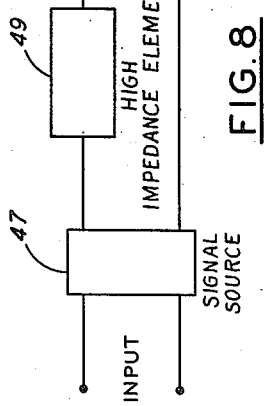
INVENTOR
FRANCIS G. BLAKE
BY Charles J. Gibeau
   [signature]
ATTORNEYS United States Patent Office 2,817,715
Patented Dec. 24, 1957

2,817,715

AMPLIFIER CIRCUIT HAVING LINEAR AND NON-LINEAR AMPLIFICATION RANGES

Francis G. Blake, La Habra, Calif., assignor to California Research Corporation, San Francisco, Calif., a corporation of Delaware Application July 15, 1952, Serial No. 299,051

2 Claims. (Cl. 179—171)

My invention relates to amplifiers, and particularly to apparatus for expanding the apparent dynamic range of amplification.

A well-known method of exploring subsurface strata of the earth is to detonate an explosive on or near the surface of the earth and to detect resulting vibrations at various locations on the earth's surface. The receiving apparatus, or geophone, receives waves of a number of types which may be classified as surface waves, refracted waves and waves reflected from various interfaces below the earth. There is a wide variation in the amplitude of the vibrations resulting from the explosions, the first waves often having 10,000 to 1,000,000 times the amplitude of later vibrations. Such waves are said to have a wide dynamic range, i. e., variation in intensity. Geophones are used to detect these vibrations and convert them to electric signals. The signals from the geophones are amplified and recorded or displayed for study of the wave shapes detected. It is difficult to design a receiver or recording apparatus which will record with sufficient fidelity weak tremors but will not be over-loaded by the high energy waves.

This problem of amplifying input signals of widely varying amplitudes may be approached from the viewpoint of designing an amplifier and recorder rugged enough and having a wide enough dynamic range to handle the high amplitude signals. It has been found preferable, however, to limit the signals wherever possible to a narrower dynamic range in order to permit the use of a more sensitive amplifier which affords a good response to low amplitude signals. Prior art devices of which I am aware which limit the input signals do so either by cutting off the peaks of the high amplitude waves or by using gain control in an amplifier to decrease the amplitude of the input signal to delicate circuit elements.

Manual or time dependent gain control is useful only in those instances in which the amplitude peak of the input waves is reasonably predictable. Seismic exploration equipment is constantly being used in new terrain in which the arrival time and amplitude of the signals picked up by the geophones is not completely predictable. Manual gain controls have been used in instances where past experience permitted reasonable estimations of the amplitudes of the incoming signals. Oftentimes, this familiarity can only be gained after a number of test shots have been made to determine experimentally the best gain variation program for the particular shot which is to be made. Some other type of gain control, therefore, must be used in which there is insufficient prior knowledge to establish a satisfactory gain control program before the shot.

Automatic gain control is a possible alternative. An automatic gain control may be a device which responds to a high amplitude signal by decreasing the gain of the amplifier. By its very nature, then, the automatic gain control requires that a high amplitude signal first be received before the automatic gain control decreases the sensitivity of the amplifier. Thus, the amplifier is not protected against an initial high surge of power. Furthermore, there is a finite delay in the operation of the control. This delay may be called the time constant of the circuit. The minimum time constant must be greater than the period of the lowest frequency wave which is to be amplified or recorded if the low frequency waves are not to be distorted. Accordingly, the volume control will respond to high amplitude pulses by decreasing the gain of the amplifier but may fail to increase the amplifier gain immediately after the pulse. A low amplitude wave which follows immediately after the high amplitude pulse may not be recorded due to the then low gain of the amplifier. An automatic gain control system with a time constant short enough to permit it to follow rapid variations in the envelope of high frequency signals will limit or severely distort low frequency signals having half periods comparable to the width of the envelope of the high frequency signals.

An instantaneous peak-limiting circuit would overcome these difficulties of automatic gain control. An instantaneous control is one which limits peaks only when they exceed a predetermined maximum and limits each such peak. An example of a commonly used instantaneous peak-limiting circuit is one which cuts high peaks off of incoming waves, i. e., it transmits faithfully waves below a predetermined magnitude but removes the portion of waves above a certain magnitude.

Apparatus which limits high amplitude signals by merely cutting off their peaks is not entirely satisfactory. No means is available in such a circuit for replacing the original peaks, and any information contained in the original peaks has been eliminated. Further, the act of clipping the peaks of the waves introduces harmonics into the circuit. These harmonics may interfere with the desired signals carried by the circuit. They cannot be readily eliminated without at the same time eliminating voltage waves which contain desired information. The peak clipping circuit may sometimes be used if, before he makes his test setup, the operator knows the frequency of vibrations which are of interest to him. Even then, the arrangement is generally useful only when the interesting vibrations are of a frequency which does not overlap the frequency spectrum of the large amplitude noise signals or their harmonics. Under these circumstances, he can filter out the undesired frequencies, and rough amplitude limiting apparatus may serve this purpose. I have found, however, that in many instances of seismic exploration, the operator does not know which frequencies will be of greatest interest to him until he has made a test shot. Then he is required to detonate another explosive and make the indicated readings. Such a procedure of "cut and try" is expensive and time-consuming.

To overcome these difficulties I have devised apparatus by which a recording may be made at the first instance of all signals picked up by the geophones which are likely to be of interest. The dynamic range of the recorded signals is limited without losing any of the information contained in the peaks. Neither of the above-described peak-limiting devices is practical in such an arrangement. The automatic gain control often obscures certain important signals, and the procedure of clipping peaks tends to introduce extraneous frequencies and to remove desired information.

Accordingly, it is an object of my invention to provide a peak limiter which protects an amplifier from surges but does not reduce its fidelity.

It is another object of my invention to provide an amplifier which transmits without distortion voltage waves of widely-varying amplitude.

It is a further object of my invention to provide a recorder and play-back combination, the output of which is a high fidelity representation of the input.

It is a further object of my invention to provide means for suppressing the peaks of a voltage wave entering an amplifier and to expand the peaks at the output to faithfully reproduce the shape of the input wave.

In apparatus according to my invention, an amplifier is used which transmits without distortion voltage waves of lower than a predetermined magnitude. For waves having a magnitude greater than this predetermined value, an instantaneous compressor is employed to decrease the scale of the higher amplitude portions of the wave. In the output portions of the circuit is provided an instantaneous expander which increases the scale of the wave beyond the predetermined magnitude and thereby reproduces the wave in the form in which it appeared at the input of the amplifier.

Further objects and advantages of the present invention will become apparent from the following detailed description taken in conjunction with the accompanying drawing which forms an integral part of the specification.

Figure 1 is a block diagram of the recording portion of a circuit according to my invention.

Figure 2 is a block diagram of the play-back portion of a circuit according to my invention.

Figure 3 is a schematic diagram of one embodiment of my invention.

Figure 7 is a representation of the response curve of a contracting circuit.

Figure 8 is a block diagram of a contracting circuit.

Figure 9 is a block diagram of an expanding circuit.

Figure 10 is a representation of the response curve of an expanding circuit.

Figure 11 is a block schematic diagram of a device for multiplying or dividing wave amplitudes.

Figure 6:
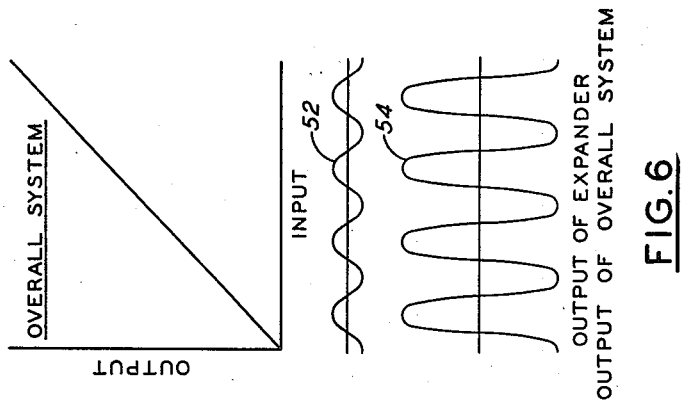
Figure 6 shows a graph of the relation between output and input of an entire circuit according to my invention and also the output wave shapes.

In Figure 1 is shown a signal source or geophone 9 which is placed in a proper position to receive the desired earth vibrations and translate them to voltage waves. The voltage wave from the geophone 9 is transmitted to an amplifier 11 and a compressor 13. The compressor 13 is a device which transmits, undistorted, that part of the voltage wave from the amplifier 11 which is below a certain predetermined magnitude. That portion of the voltage wave which is above this magnitude is distorted so that the output of the compressor 13 is the logarithm of the portion of the wave above the predetermined magnitude. The construction and operation of the compressor 13 is to be explained in more detail hereinafter. A recorder 15 is connected through an amplifier 17 to the output of the compressor 13. The recorder then records the low amplitude portions of the voltage wave in a one-to-one scale but records the logarithm of the higher amplitude portions of the wave.

Referring to Figure 2, the play-back instrument 19 emits an undistorted representation of the signal received from the recorder or transmitter 15 in the recording circuit shown in Figure 1. This signal is transmitted to a high gain amplifier 21 which is connected to an analyzer or the desired display circuit, not shown. A compressor 23 is connected between the output and input of the high gain amplifier 21 to provide a negative feed-back. The compressor 23 in Figure 2 is of a nature similar to that of the compressor 13 in Figure 1, since its output is an undistorted representation of its input for waves below a certain predetermined amplitude and is the logarithm of that portion of the waves above the predetermined magnitude. By providing negative feed-back, the compressor 23 reverses the operation of the compressor 13 and causes the output of the high gain amplifier to represent faithfully the input to the recorder amplifier 11, in a manner to be described in more detail later.

The manner of operation of the compressor 23 can be qualitatively explained in the following way: the compressor 23 provides a negative feed-back directly proportional to the magnitude of the waves at the output of the high gain amplifier 21 for that portion of the wave below a predetermined magnitude. The negative feed-back through the compressor 23 resulting from the portions of the output above the predetermined magnitude is decreased to the logarithm of that magnitude. Thus, the negative feed-back through the compressor 23 decreases the response of the amplifier to the low amplitude portions of the wave more than it decreases the response of the amplifier to the high amplitude portions of the wave. The output of the high gain amplifier then represents a faithful reproduction of the low amplitude portion of the wave coming from the play-back 19 plus the anti-logarithm of the high amplitude portions of the wave coming from the play-back 19. The signal amplifier or display circuit then receives in undistorted form the entire signal emitted from geophone 9.

The signal fed back in a conventional feed-back circuit is usually a linear function of the output of the amplifier. In the circuit shown in Figure 2, however, the signal fed back is a non-linear function of the output—a quasi-logarithmic function. The operation of the circuit will be described mathematically. In the circuit shown in Figure 2

$$e_{out} = A e_{in}$$

where $e_{out}$ = the output voltage of the amplifier
$A$ = the amplification of the amplifier
$e_{in}$ = the input voltage of the amplifier Let $$e_{fdbk} = f(e_{out})$$

where $f(e_{out})$ is a function of $e_{out}$ and $e_{fdbk}$ is the feedback voltage.

Then, according to the principle of conventional feed-back circuits $$e_{sig} = e_{fdbk} + e_{in}$$

where $e_{sig}$ is the voltage output of the playback of receiver 19.

We have then $$e_{out} = A e_{in} = A(e_{sig} - e_{fdbk}) = A(e_{sig} - f(e_{out}))$$
$$e_{out} + A f(e_{out}) = A e_{sig}$$

Now, if $(e_{out})$ is negligibly small compared with $A f(e_{out})$, as will be the case when the amplifier 21 has a high gain (i. e., A is a large number), and when $f(e_{out})$ is at least a substantial fraction of $e_{out}$, we have the approximate relation $$e_{sig} = f(e_{out})$$

A circuit in which this relationship holds is said to have a high loop gain. If $$f(e_{out}) = \log e_{out}$$
$$e_{sig} = \log e_{out}$$

and $$e_{out} = \text{anti-log } e_{sig}$$

Thus, the compression or distortion introduced by the compressor 13 is removed by the expander shown in Figure 2 and the signal is restored to its original form if no intermediate element in the circuit has distorted the signal appreciably or varied its scale.

The feed-back shown in Figure 2 causes the output of the amplifier 21 to be undistorted for amplitudes which are not affected by the compressor 13 shown in Figure 1, and causes the output of the amplifier 21 to be the antilogarithm of the portions of the signal which are compressed by the compressor 13. The theory, of course, applies to circuits in which the elements 13 and 23 distorted the signals passing through them in similar fashions. A similar circuit can be used in which the compressors 13 and 23 reduce a wave other than logarithmically. Generally, the output of the compressor must be a monotonic function of its input for the circuit to operate satisfactorily. The compressor can, for example, be of such a type that its output is the square root of its input signal and the expander circuit shown in Figure 2 would then operate to provide an output which is the square of its input.

Hitherto, it has been a common practice to record only the portion of the output of the geophone which was considered to fall within the frequency and amplitude range which was likely to be of interest. I have found that not infrequently the information gained from this recording indicated the desirability of recording waves of different frequencies and additional recordings were required. Using the present arrangement, however, I am able to record the entire signal within a wide frequency range and filter out the undesired frequencies at the analyzer. This characteristic of my circuit arises in part from the fact that recording apparatus can be used which is sensitive to waves of all the frequencies which are likely to be of interest. My compressor circuit protects the recorder against high surges without distorting the signal that is ultimately played back. If a study of these filtered signals indicates the desirability of additional studies, I have merely to employ a different frequency filter and can use the same recording to extract further information from the test.

An advantage of the use of the compressor for reducing signal peaks logarithmically and later for expanding them antilogarithmically is that it permits the use of amplifiers, recorders, and play-back apparatus which are capable of handling only a relatively narrow range of amplitudes. Nevertheless, the final play-back of the recording includes the full range of amplitudes as originally detected by the geophone.

Figure 3 shows the circuit of one embodiment of the compressors 13 or 23 in more detail. A voltage is impressed between the terminals 25 and 27 through the resistor 29 to a pair of conductors 31 and 33 which are connected to the input of an amplifier 17. Between the conductors 31 and 33 are rectifiers 35 and 37 in series with batteries 39 and 41. The batteries are connected to oppose current flow in rectifiers 35 and 37 and the rectifiers are oriented to conduct current in opposite directions. When the voltage impressed between the terminals 25 and 27 is less than the sum of the voltage of the bias battery 39 plus the voltage required to cause the rectifier 35 to conduct, the output signal impressed on amplifier 17 is substantially the same as the input voltage. When the input voltage is above this value, the rectifiers 35 and 37 conduct alternately during each cycle to shunt a portion of the input current past the input to amplifier 17. The batteries 39 and 41 are similar and the rectifiers 35 and 37 are similar. The rectifiers 35 and 37 are nonlinear devices, and the amount of current which they shunt is a nonlinear function of the input voltage. If the rectifiers 35 and 37 are thermionic diodes or fall within a known class of contact rectifiers, the relationship between current and voltage through them is approximately logarithmic. The effect of the circuit shown in Figure 3, then, is that voltages below a predetermined potential impressed between terminals 25 and 27 are substantially undistorted when impressed on amplifier 17. This predetermined potential is equal to the voltage of battery 39 (or 41) plus the voltage required to render rectifier 35 (or 37) conductive. If the voltage impressed between terminals 25 and 27 is above this predetermined value, the voltage impressed on amplifier 17 is equal to the predetermined potential plus the logarithm of the difference between the predetermined potential and the potential impressed between the input terminals 25 and 27.

The compressor used in the circuit shown in Figure 2 is substantially the same as that shown in Figure 3, and due to its use in a negative feed-back connection, it creates an antilogarithmic effect.

Figure 5:
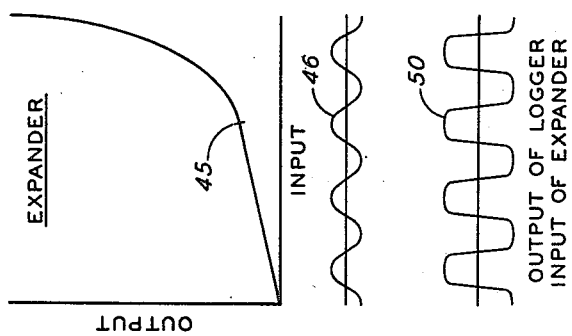
Figure 5 is a graph showing the relationship of output to input of the expander circuit and also the input wave shapes.
Figure 4:
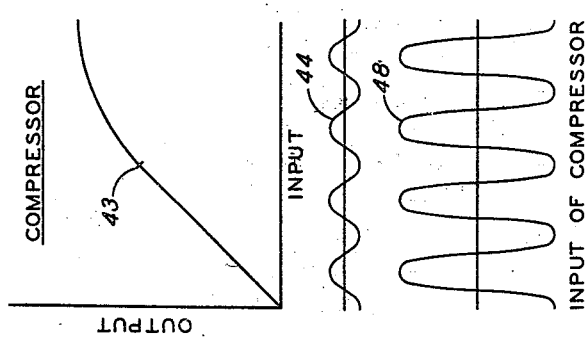
Figure 4 is a graph showing the relationship of output to input of the compressor circuit and also the input wave shapes.

For a further explanation of the operation of a circuit according to my invention, reference is made to Figures 4, 5 and 6, which show the gain of different parts of the present circuit. As is shown in Figure 4, the compressor is linear for voltages up to a predetermined magnitude 43 above which its response is logarithmic. For a low amplitude sine wave input 44, the compressor 13 imparts no distortion as is indicated in Figure 5 in which the voltage curve 46, which represents the output of the compressor and, therefore, the input of the expander, is identical to curve 44. For a higher amplitude sine wave input 48, the compressor flattens the peaks of the waves. The compressor converts a very high amplitude wave into almost a square wave shape 50. The response of the compressor is linear from zero voltage to the point 43. The curve 44 shows a sine wave of low amplitude which is undistorted throughout the system. The high voltage wave 48 is undistorted in the range where the input is lower than that at the point 43. The curve 50 shows the almost square wave shape which results when the compressor operates on the high amplitude wave 48. It is to be noted that the curve 50 is not a square wave. The peak of the curve is at the same point in time and the slope has the same algebraic sign as that of the original wave. If there were an irregularity or dip at the peak of the input wave 48 to the compressor, this irregularity would appear in the wave 50 merely decreased in amplitude.

This signal is recorded and played back into the amplifier 21 having the compressor 23 in its feed-back circuit. As shown in Figure 5, the combination of the amplifier 21 and the compressor 23 has a linear response to a point 45 and an anti-logarithmic response to waves having an amplitude greater than that magnitude.

Figure 6 illustrates the over-all gain of the recorder-play-back arrangement and shows the composite effect of the use of a compressor in the recorder circuit and an expender in the play-back circuit. The over-all response is linear. Thus, if a low amplitude sine wave 44 has passed through the compressor undistorted, its amplitude in the play-back circuit will be low enough so that it is affected only by the linear portion below point 45 of the gain curve of the play-back circuit and will be undistorted by the amplifier 21 and compressor 23 as is illustrated in curve 52. A high amplitude signal 48 which has been converted by the compressor into a wave 50 having a flattened peak or substantially a square wave operates in both the linear and the antilogarithmic portion of the gain curve of the play-back and is converted back into a high amplitude sine wave 54. It is seen at the output circuit of the play-back in the same form as it was detected originally by the geophone. The resultant effect of the entire apparatus is that a signal detected by the geophone is distorted and restored within the apparatus in such a manner that it is finally registered at the output circuit in its original form.

It is not essential that the compressor 13 be a logarithmic response device if it is to contract the wave in an expandable fashion. If the compressor has a voltage-current curve such that the ratio of voltage to current, $e/i$, decreases as current increases, a similar compressor may be used as the expander in the circuit shown in Figure 2. The over-all effect of the circuits shown in Figures 1 and 2 will be the same as if the compressor contained logarithmic response units. An example of the response curve of a suitable compressor is shown in Figure 7. The response curve need not be of the shape shown but must be single valued having $$\frac{d^2e}{di^2}<0 \text{ and } \frac{de}{di}>0$$

The expander will then transmit the inverse of its received signal to an output circuit. In defining inverse of a signal, we can say that $G(x)$ is the inverse of $f(x)$ if the following relationship holds $f(x)=y$; $G(y)=x$. Then, if a signal is distorted to become $f(e)$, the inverse of the distorted signal is $G[f(e)]$.

Figure 8 shows a schematic diagram of a compressor which could be used as the element 13 of Figure 1. The signal source 47 is connected through a high impedance element 49 to a low impedance element 51, the impedance of which varies in accordance with the relationship set forth with reference to Figure 7. The high impedance element 49 causes the signal source 47 to appear to provide constant current, regardless of variations in the impedance of element 51. If it is desired to compress the amplitude of certain waves emitted by the source 47, the variable impedance of the element 51 must be small as compared to the impedance of the element 49. The output then is a wave in which the desired compression has been effected.

The play-back circuit shown in Figure 9, an alternative to that shown in Figure 2, is one having a low impedance source 53 connected through an element 52, which is similar to element 51, to an output element 55, the impedance of which, when combined with the impedance of the play-back source 53, is small when compared to the impedance of element 52. The low impedance source 53 appears to the element 52 as having constant voltage, regardless of variations in the impedance of element 52. The circuit shown in Figure 9 replaces the amplifier 21 and compressor 23 of Figure 2. The result of employing the circuit shown in Figures 8 and 9 is that the wave is compressed according to a predetermined pattern and is expanded accurately to its original shape by the circuit shown in Figure 9, provided that the signal level at element 52 is the same as at element 51, since the latter circuit, Figure 9, is so arranged that its output is varied in a manner inverse to the variation caused by the circuit shown in Figure 8.

If the elements 51 and 52 have a voltage current relationship such that the ratio of voltage to current, $e/i$, increases as $i$ increases, the circuit shown in Figure 8 will expand the wave and the circuit shown in Figure 9 will contract the wave. An example of such a response curve where $e/i$ increases as $i$ increases is shown in Figure 10. If it is desired to contract the wave in order to pass it through instruments having a low dynamic range, the element 53 shown in Figure 9 may be a geophone or other input circuit and its output may be a recorder or a transmitter. The element 47 shown in Figure 8 may be a play-back or a receiver. The signal is then contracted by the circuit shown in Figure 9 and expanded by the circuit shown in Figure 8. An analyzer may be connected to the output of the circuit shown in Figure 8.

One example of such a nonlinear element is shown on page 70 of Wave Forms, Chance, Hughes, MacNichol, Sayre and Williams, vol. 19, Radiation Laboratory Series, McGraw-Hill Book Company, Inc., 1949. As shown in Fig. 3.35, a germanium crystal has the desired characteristics. If voltage is the ordinate and current is the abscissa, the curve of voltage versus current is concave downward in the first quadrant and concave upward in the third quadrant. In the forward direction of a crystal diode, then, the characteristic is that shown in Fig. 7, and in the backward direction of the diode the characteristic is that shown in Fig. 10. If a crystal diode is to be used in an alternating current circuit, diodes may be connected in parallel with opposite polarities so that the forward conduction characteristics of the diodes control.

Such a circuit is shown in Fig. 3 of the present application. If the characteristics shown in Fig. 10 are desired to control the amplitude of both the positive and negative half cycles of alternating current, two crystal rectifiers may be connected in series with opposite polarities. In such an arrangement, the back resistance characteristics of the diodes control. Crystal diodes are only one example of nonlinear elements which may be used in accordance with applicant's teaching.

Such a characteristic also exists with respect to the circuits shown in Figures 1 and 2. If the elements 13 and 23 of these drawings have the voltage current relationship such as that described with reference to Figure 10, the circuit shown in Figure 2 will be a contractor and that shown in Figure 1 will be an expander. In that event, the signal source 9 and receiver 19 can be interchanged, and the recorder 15 connected in place of an analyzer. We then have a contracting expanding circuit which operates similarly to that previously described.

In the earlier explanation, the elements 13 and 23 were described as logarithmic devices which transmit the logarithm of their input signals. The circuits shown in Figures 1 and 2 can be combined differently to afford a valuable aid in analyzing the input signal. In the analysis of waves it has sometimes been found desirable to mulitply two waves in order to facilitate their study. Figure 11 shows a circuit for multiplying waves. Elements 57 and 59 are circuits such as that shown in Figure 1 which operate on the wave logarithmically. Their signals are fed into an adder 61, which combines their signals by either adding or subtracting at the will of the operator. The signal from the adder is fed into the circuit 63, which is that shown in Figure 2 of the drawing. The circuits 57 and 59 feed into the adder the logarithmic portions of their respective input signals; the adder combines these outputs and transmits them to the receiving circuit 63, the output of which is the anti-logarithm of a portion of its input. The output of the circuit 63, then, is the product or quotient of the portions of the input waves to the circuits 57 and 59 which were reduced to their logarithm in the compressor elements 13 of the circuits and the sum or difference of the portions of the waves which were not reduced to their logarithm. The adder 61 may take any of a number of well-known forms; for example, the signals from the circuits 57 and 59 could be impressed between the grid and cathodes of two triodes having a common cathode resistor. Such an adder is shown in Wave Forms, page 643, Fig. 18.14 and a subtractor is shown on page 642, Fig. 18.13.

The present invention has been described with reference to an instantaneous contractor-expander circuit which has a number of advantages resulting from the absence of time delay. In some applications of these circuits it may be satisfactory or desirable to employ elements which operate in response to the average amplitude of the input waves. Such an element would be a thermistor or tungsten light bulb which would replace the elements 35, 37, 39 and 41 shown in Figure 3, or the elements 49 and 52 shown in Figures 8 and 9. The thermistor or light bulb would be connected between the terminals 31 and 33 of Figure 3 instead of the elements 35, 37, 39 and 41, if the circuit shown in Figure 3 is to be used.

The present invention has been described with reference to a recorder and a play-back. If the element 15 of Figure 1 is a transmitter, and the element 19 of Figure 2 is a receiver, the circuit will operate essentially as previously described, except that it will provide an instantaneous display of the voltage wave rather than a display from a record. In any event, it may be used where the dynamic range or amplitude acceptance of elements in the circuit is less than the dynamic range of the signal.

It will be apparent to those skilled in the art that numerous modifications and changes may be made in the apparatus disclosed herein without departing from the teaching of this invention. Accordingly, all such modi-

I claim:

1. Apparatus for amplifying an electrical signal of wide dynamic range, with amplification decreasing instantaneously with increasing amplitude of signal so that the signal may be recorded on a recorder having a narrow dynamic range, comprising an amplifier including a pair of conductors for impressing said signal across the input of the amplifier, a non-linear network including a resistor in series with one of the conductors and a pair of parallel branches connected across the conductors and the input of the amplifier, each branch including a diode rectifier and a constant non-varying source of D.-C. bias with one side of the rectifier connected directly to one of the conductors and the other side connected directly to one side of the bias source and the other side of the bias source connected directly to the other conductor, each branch being otherwise free of bias voltages, the rectifier and the bias source being oppositely poled in each branch and the rectifiers being oppositely poled in the different branches, said bias sources being of equal voltage and being operative to prevent current flow through the rectifiers when the signal amplitude is below a predetermined instantaneous value determined by the bias voltage and said rectifiers being operative to present an instantaneously non-linearly decreasing impedance to the signal as the instantaneous value of the signal increases above said predetermined value, whereby the signal at the output of the amplifier is compressed in dynamic range with respect to the original signal with signals of amplitudes below said predetermined level being substantially undistorted and signals of amplitudes above said predetermined level being distorted in non-linear form with changing level.

2. The apparatus of claim 1 in which said bias sources are batteries.

References Cited in the file of this patent

UNITED STATES PATENTS

| | | |
|---|---|---|
| 2,118,175 | Doba | May 24, 1938 |
| 2,156,658 | Shore | May 2, 1939 |
| 2,193,966 | Jones | Mar. 19, 1940 |
| 2,221,681 | Schlegel | Nov. 12, 1940 |
| 2,295,410 | Kreuzer | Sept. 8, 1942 |
| 2,313,096 | Shepard | Mar. 9, 1943 |
| 2,329,558 | Scherbatskoy | Sept. 14, 1943 |
| 2,554,905 | Hawkins et al. | May 29, 1951 |